US007480900B1

(12) United States Patent  
Zhou et al.

(10) Patent No.: US 7,480,900 B1  
(45) Date of Patent: Jan. 20, 2009

(54) SYSTEM AND METHOD FOR ADAPTIVE SOFTWARE TESTING

(75) Inventors: Charles Jianping Zhou, Mountain View, CA (US); Teh-Ming Hsieh, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1022 days.

(21) Appl. No.: 10/826,025

(22) Filed: Apr. 15, 2004

(51) Int. Cl.
*G06F 9/44* (2006.01)

(52) U.S. Cl. .......................... 717/132; 714/38; 714/46
(58) Field of Classification Search ......... 717/124–133, 717/144; 714/38, 39, 45, 46, 51, E11.009, 714/E11.207–E11.219

See application file for complete search history.

(56) References Cited

U.S. PATENT DOCUMENTS

| | | | | |
|---|---|---|---|---|
| 5,313,616 A | * | 5/1994 | Cline et al. | 717/127 |
| 5,751,941 A | * | 5/1998 | Hinds et al. | 714/38 |
| 5,758,061 A | * | 5/1998 | Plum | 714/35 |
| 5,892,947 A | * | 4/1999 | DeLong et al. | 717/100 |
| 5,933,640 A | * | 8/1999 | Dion | 717/132 |
| 6,088,690 A | * | 7/2000 | Gounares et al. | 706/13 |
| 6,282,527 B1 | * | 8/2001 | Gounares et al. | 706/13 |
| 6,804,634 B1 | * | 10/2004 | Holzmann et al. | 703/2 |
| 7,296,197 B2 | * | 11/2007 | Pushpavanam et al. | 714/722 |

* cited by examiner

*Primary Examiner*—Meng-Ai An
*Assistant Examiner*—Diem K Cao
(74) *Attorney, Agent, or Firm*—Park, Vaughan & Fleming LLP

(57) ABSTRACT

A system and method for mapping software components (e.g., source files, binary files, modules) to test cases that test the components and providing rating information regarding each test case's effectiveness against its tested components. Each test case is applied to test a corresponding subset of the components, during which data are gathered (e.g., amount or elements of a component that were tested, which components were tested, time). Each test case is applied separately so that correlations between each test case and the corresponding subset of the software components can be recorded (and vice versa). A rating is generated to indicate how completely or effectively a test case covers a software component. A bipartite graph and/or other data structures may be constructed to map test cases to the software components they test, and vice versa.

28 Claims, 2 Drawing Sheets

SYSTEM AND METHOD FOR ADAPTIVE SOFTWARE TESTING

BACKGROUND

This invention relates to the field of computer systems. More particularly, a system and methods are provided for testing software in an adaptive manner, to provide maximum test coverage in a minimum period of time.

In software engineering, a great deal of effort is necessarily dedicated to testing software, and the testing methods and strategy have a direct impact on the quality of the end product. Traditional blackbox and whitebox methods for testing software generally provide quality and coverage information only during the test development period. After the test development cycle has been completed, test execution alone generally fails to instill full confidence that the software under test has been thoroughly and accurately examined. This is because most software, after its initial release, will still require dynamic code changes for optimization, additional functionality, bug fixes, etc.

Currently, most common testing techniques still include manual testing and/or the use of static test scripts. Although a software tester may become familiar with particular test scripts or cases, they are often not updated as the software being tested evolves. Thus, the test cases that are applied, and the software components they are applied against, often do not match well over time. As a result, it is difficult to achieve clear, effective and systematic test planning, execution and control.

In addition, many test cases or scripts grow in uncontrolled (or at least undocumented) fashion. Over time, they may become complex, unwieldy and difficult to follow as they are manually modified to attempt to match evolving software. And, modifications often lack objectivity, due to time constraints or lack of knowledge of the software. Thus, any given test case may become so obsolete that it no longer fully tests the functionality of a program, or does not test the functionality that needs to be tested or that is expected to be tested.

Furthermore, most test processes will perform a full test cycle for every software change, even if the test cycle tests far more than is needed. For example, even if only one component or one function of a modular set of software needs to be tested, test cases for testing that component and test cases for testing many other components or functions will all be executed. This wastes time and may prevent the software from being released on schedule.

Also, test cases or scripts may become more and more redundant or obsolete over time, as the bugs they are intended to catch are caught and fixed. The test cases or scripts may continue to be run in their entirety, to test for bugs that will no longer be found, because there is no automated mechanism to allow more accurate matching of tests and software components or functions.

In general, it is desirable to employ tests that will have the highest probability of finding the most errors, with a minimal amount of time and effort. However, after a period of time, existing test cases or scripts may no longer correlate well with ever-changing target software components. Thus, it is often not known which portion of the software will be tested by which test cases. Commercial testing and debugging tools cannot identify, for a given portion of software, which test cases will test that portion. They also do not provide any rating of how well a test case covers a software component; they generally treat all test cases as being equal. During test execution, it is important to know which test cases are affected by which software changes.

Also, it is often physically impossible to test every permutation or aspect of a program. There may be only a limited amount of time available for testing. At some point, a decision may need to be made as to how much testing to perform, or whether sufficient testing has been performed. When it is not fully known how much of the software that needs to be tested has been tested (e.g., because test cases are not well understood), it can be very difficult or even impossible to make a correct go/no-go decision.

Thus, there is a need for a method of testing software that provides justifiable confidence that software components or functions that need to be tested have been tested, and that test cases applied during testing actually tested the components or functionality that need to be tested.

SUMMARY

In one embodiment of the invention, a system and methods are provided for mapping software components (e.g., source files, binary files, modules) to test cases that test those components. During application of each test case, various data are gathered (e.g., amount or elements of a component that were tested, which components were tested, time). Each test case is applied separately so that correlations between each test case and the corresponding subset of the software components can be recorded (and vice versa).

A bipartite graph may be constructed to map each test case to the software components it tests, and vice versa. A component node of the graph, corresponding to a software component, may identify the test cases that test the component, may indicate the component's dependence on other components, etc. Components or component nodes may be sorted by their length, complexity, line number size, etc. A test case node, corresponding to a test case, may identify the components it tests, how much of a component it tests, how effective it is, etc.

An edge, connecting a component node and a test case node, may identify how much time is needed to run a test case, a software or hardware configuration needed to run the test case, how well or how fully a test case covers the corresponding software component, etc. In different embodiments of the invention, edges (or nodes) may have ratings indicating how completely or effectively a test case covers the corresponding software component.

During each test case's execution, the instructions, functions, modules or other components it tests may be tagged. Between test case executions, the components may be cleared in advance of the next test case's taggings. Or, different tags may be generated for different test cases. A tag file records portions of the source code or software component covered by each test case. In addition, links between software components and corresponding test cases are established and recorded.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for optimized adaptive software testing. The testing may be considered adaptive in that it facilitates accurate matching of individual software components (e.g., source or binary files) with test cases or scripts that will test those components. Thus, as the software evolves, the system allows targeted testing of new or altered functionality.

In addition, an embodiment of the invention allows one to perform more accurate testing of selected software components or functionality. Thus, if just one component or function is to be tested, a set of test cases suitable for testing that component can be easily identified. This avoids wasting time running test cases not related to the selected components or functions.

In an embodiment of the invention, one or more test cases are identified for testing source code files, object code files or other software components through one complete run. This identification process yields a profiling database that may be used for tagging software components during testing. The test cases may be pre-existing, or may be newly developed. The software components to be tested are also identified.

In this embodiment of the invention, a bipartite graph and/or other data structures are created to reveal relations between test cases and software components. Thus, for each test case, the software components exercised by that test case are readily apparent. And, conversely, for each software component, the test cases that exercise that component are identified. The graph may contain ratings or information indicating how well a given software component is covered by a particular test case. For example, the ratings may indicate how much (e.g., a percentage) of the component is exercised by the test case. This information may be used to order test cases for execution against a component, based on their effectiveness and/or how long the test cases take to execute.

Figure 1:
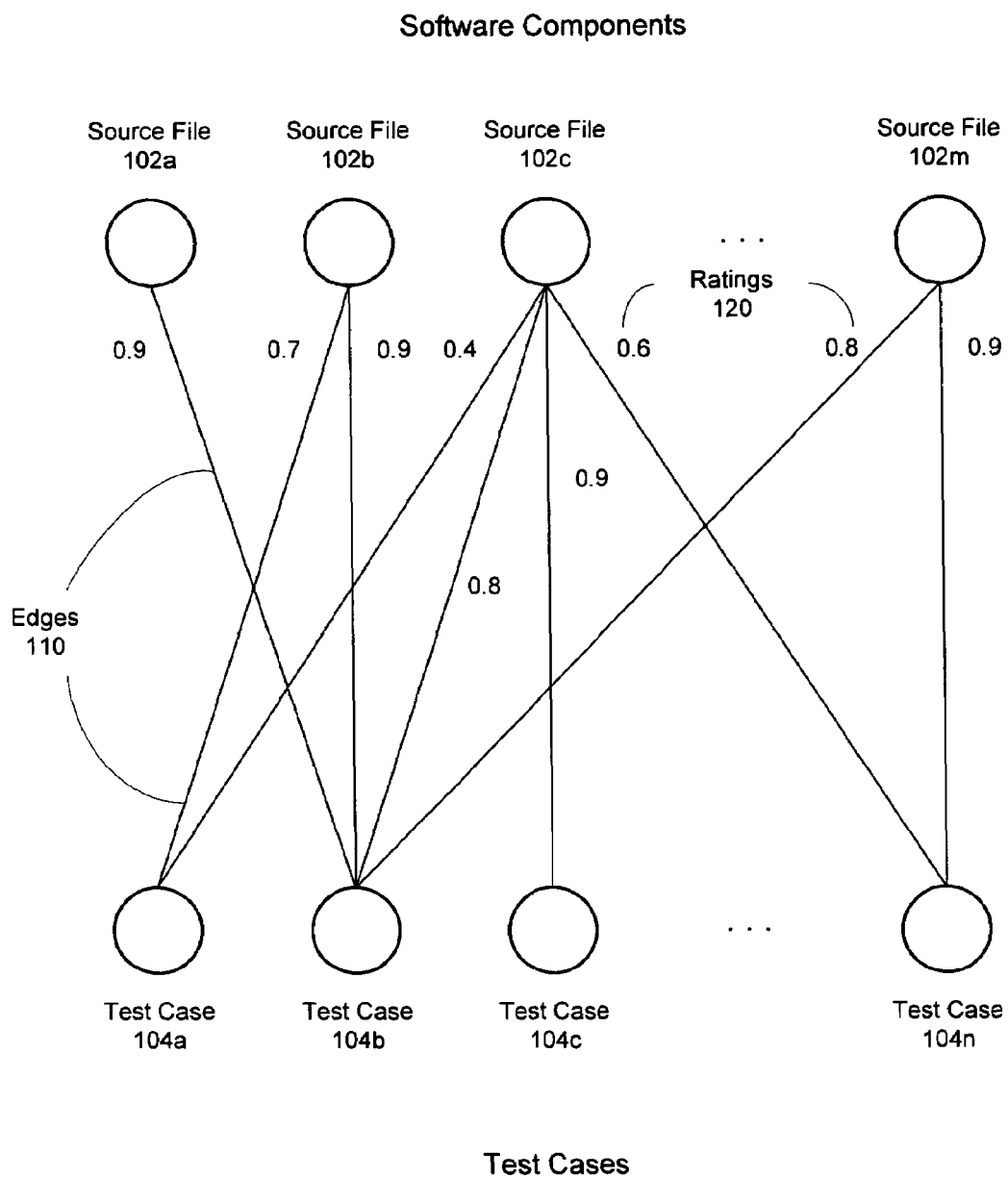
FIG. 1 is a diagram of a graph mapping test cases to software components tested by the test cases, in accordance with an embodiment of the present invention.

FIG. 1 demonstrates a resultant graph, connecting test cases and software components, according to one embodiment of the invention.

In this embodiment, the software components being tested are represented by their source files 102, which may be written in virtually any programming language (e.g., C, C++, Java). In other embodiments, the software may be represented by the binary files (i.e., object code) produced when the source files are compiled, individual functions or methods, the resulting executable libraries or applications, and/or other components.

Test cases 104 are test scripts or programs designed to exercise any portion of the software being tested. Thus, different test cases may be developed to test different functionality or components, to test different orders of execution of the software, to test for different types of bugs, etc. In the illustrated embodiment of the invention, the test cases are run against the application or executable that is generated from source files 102 (e.g., the application created by linking together the object files produced from the source files).

Each source file or software component 102 is linked, by edges 110, to the test cases 104 that cover that component. For example, test case 104a, when executed, will test source files 102b, 102c. More specifically, during operation of test case 104a, one or more executable instructions derived (e.g., compiled, interpreted) from the programming code of source files 102b, 102c will be executed. A test case may cover any number of source files, and a source file may be covered by any number of test cases.

A rating 120 is a value corresponding to the test case and software component connected by an edge 110. For example, a rating may comprise a code coverage rating indicating how fully or accurately the test case covers the component. The ratings may be normalized. Thus, the edges connecting source file node 102b with test case nodes 104a and 104b reveal that test case 104b covers source file 102b better or more completely than test case 104a. As described below, ratings 120 may be generated by observing execution of test cases and determining how much of a software component is exercised by each test case.

In different embodiments of the invention, coverage ratings may be objective or subjective. In one embodiment, an objective code coverage rating reflects a percentage of all code in a source file that is tested by a test case, and makes no allowance for dead code—code that will not be executed.

In another embodiment of the invention, a subjective code coverage rating requires an examination of code that is not covered by a test case, in order to determine whether such code is dead code. The resulting rating does not consider dead code.

Further, some test cases may be configured to only "touch" certain code in a source file, while other test cases actually test that code. Among test cases having the same basic code coverage rating for a source file, a test case that tests the source, rather than just touching it, may be rated higher.

In an embodiment of the invention, the graph of FIG. 1 is stored electronically, and each source file node and test case node stores certain information. For example, each source file node 102 may include such things as: file ID (identification of the source file), file name (name of source file), number of lines in the source file, complexity metrics indicating the source file complexity, identities of related test cases, time, coverage/effectiveness ratings against each related test case, etc. A source file node may also identify how much of the source file is covered by a test case, which portions (e.g., lines, modules, functions) were tested by a test case, a software and/or hardware configuration for executing the source file, etc.

A test case node 104 may contain a test case ID and a corresponding tag ID for retrieving a code coverage rating. A test case node may also identify the source files covered by the test case, how much of each source file was covered, a software and/or hardware configuration for running the test case, how long the test case takes to execute, how effective the test case is at locating certain types of bugs, whether it is redundant to another test case, etc.

Using the graph of FIG. 1, one can easily identify the source files that are exercised by a particular test case and, conversely, which test cases exercise the functionality of a particular source file. Therefore, a software tester can quickly determine which test cases should be run to test the code of a particular software component.

For example, if only source file 102c needs to be tested (e.g., it is the only one modified during a development stage of the software), then any or all of test cases 104a, 104b, 104c and 104n may be used to test it. However, if the ratings of FIG. 1 are interpreted as "effectiveness" ratings, and if time is of the essence, the graph reveals that test case 104c has the highest effectiveness rating against component 102c. Thus, it may be most efficient to apply test case 104c first, then possibly follow with other test cases based on their ratings.

As another example, in which source file 102*b* needs to be tested, the graph of FIG. 1 shows that test cases 104*a* and 104*b* are the only applicable test cases.

During development and testing, source files 102 and/or test cases 104 may be updated. However, as the test cases are exercised, the graph of FIG. 1 can be continually updated to reflect the coverage of the various test cases.

In one embodiment of the invention, to generate the graph of FIG. 1 to map between test cases and software components or functionality, each test case to be mapped is executed in a controlled environment. For example, test case 104*a* may be executed, and each instruction, function, method, module, file or other element of the software components that it covers (i.e., source files 102*b*, 102*c*) may be tagged or marked.

After test case 104*a* finishes executing, information regarding the test is saved, and edges between test case 104*a* and the tested source files can be created. Further, the node for test case 104*a* may be updated with information such as the amount of time that was needed to run the test case, the identities of source files 102*b*, 102*c* (and/or the tested elements within the files), etc. The nodes for source files 102*b*, 102*c* are updated to identify test case 104*a* and/or the elements within the files that were exercised by the test case.

Then the tags of the target software components are cleared, and the next test case can be executed. The graph can thus be generated and/or updated over time, as different test cases are executed.

Based on a graph of software components and test cases, test cases may be modified to test more or fewer components, or different instructions, functions or other elements of a component. For example, if a particular function or sequence of instructions of a source file is not currently tested by any test case, one or more test cases can be modified (or a new one developed) for that purpose.

Execution of test cases for the purpose of generating the graph of FIG. 1 may be performed by a testing tool configured to exercise the various test cases, perform the necessary tagging, clear the taggings for the next test case, etc. The same tool or environment may be used to perform live testing of the software, i.e., the operation of multiple test cases, with or without the tagging and un-tagging used to facilitate creation of the graph.

Figure 2:
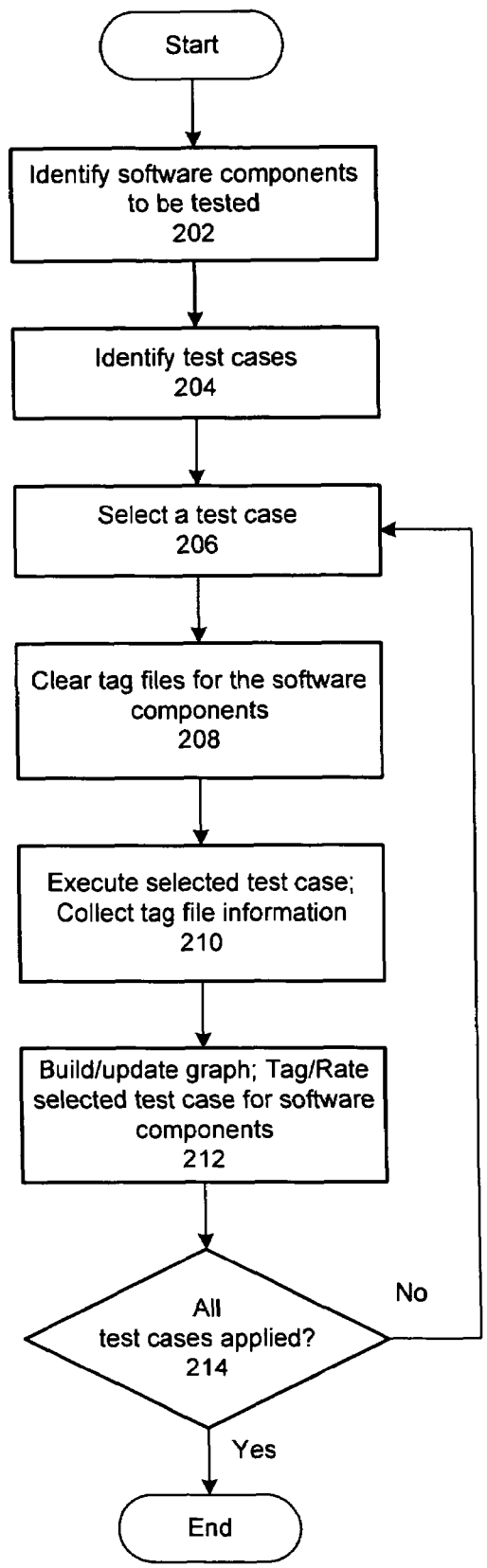
FIG. 2 is a flowchart illustrating one method of mapping test cases to software components, in accordance with an embodiment of the invention.

FIG. 2 demonstrates a method of generating a graph of software components and test cases, to facilitate the adaptive testing of the components, according to one embodiment of the invention.

In operation 202, the software components (programs, files, modules, functions) to be tested are identified. A component node may be generated in the graph for each component, and configured to store information described above (e.g., test cases that cover the component). The software components or component nodes may be sorted in any order (e.g., by length, size of line numbers, complexity, relative importance). Illustratively, the relative importance of a component may be measured by the number of other components that depend upon it.

In operation 204, test cases to be applied to the software components are identified. A test case node may be added to the graph for each test case, and may be configured to store information described above (e.g., identities of the source file(s) covered by the test case, the execution time of the test case). Test cases or test case nodes may be sorted by size, the number of components they test (or are expected to test), the amount of time needed for them to run, or any other criteria.

In operation 206, one of the test cases is selected. In this embodiment of the invention, the test cases are arranged in sequence and executed sequentially.

In operation 208, any taggings of the software components performed during execution of a previous test case are cleared.

In operation 210, the selected test is applied or executed. During its application, the instructions, functions or other component elements that are exercised are tagged or marked. Or, just the individual components may be tagged.

In one embodiment of the invention, statistics and/or ratings may be kept to reflect how much of the component was exercised (e.g., 60% of the component's instructions, 70% of the component's functions). Illustratively, the statistics and ratings may be maintained as part of a source file node of the graph. For example, a normalized value between 0 and 1 may be assigned to indicate how much of a given software component was tested by the test case.

In operation 212, the graph is updated with edges connecting the test case to each software component it covered. In one embodiment of the invention, a graph edge stores information regarding the hardware and/or software configuration under which the connected test case can be (or was) applied to the connected software component, the amount of time needed to run the test case or to run the test case on the connected component, the coverage rating generated in operation 210, and/or other information.

The test case's node in the graph is updated with information generated or gathered during its execution, and the component nodes may also be updated with test statistics or results.

In operation 214, it is determined whether all test cases have been applied. If they have not all been applied, the illustrated method returns to operation 206. When all test cases have been applied, the method ends.

After the graph is completed, it can be used to better match test cases and software components. For example, if a component is modified during development, or to fix a bug during testing, the graph node representing the component can be selected, and the test cases that test that component are identified—by information in the component's node, or by following edges connected to the node.

Also, the graph may be used to (automatically) plan or schedule testing of some or all of the software components. Thus, test cases may be scheduled based on their coverage ratings, how fast they run, the importance of the various software components, their effectiveness at finding particular bugs or of testing certain aspects of the software, etc. And, if only a subset of the components need to be tested, test cases can be scheduled that provide no (or minimal) testing beyond those components.

The graph can also be used to identify test cases that no longer provide a benefit to the testing regimen, and which can therefore be removed from a testing suite. For example, depending on the coverage ratings or analysis, if all the software components (and/or component modules, functions, instructions, etc.) tested by one test case are also tested by others, then that test case may provide unnecessary or undesired redundancy.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of mapping software components to test cases that test the software components, the method comprising:
   for each component in a set of software components, generating a corresponding component node in a bipartite graph;
   for each test case in a set of test cases configured to test the software components, generating a corresponding test case node in the graph;
   for each test case:
      applying said test case to test one or more software components;
      collecting data reflecting application of said test case; and
      updating the graph with edges coupling said corresponding test case node to one or more component nodes corresponding to software components tested by the test case; and
   for each software component tested by a test case, calculating a coverage rating configured to indicate the coverage achieved from executing said test case on said software component, wherein the coverage rating is normalized to exclude dead code.

2. The method of claim 1, further comprising:
   associating said coverage rating with the edge coupling the test case node corresponding to said test case to the component node corresponding to said software component.

3. The method of claim 1, further comprising:
   associating said coverage rating with the test case node corresponding to said test case.

4. The method of claim 1, further comprising:
   associating said coverage rating with the component node corresponding to said software component.

5. The method of claim 1, wherein the method further comprises, for each test case:
   updating said corresponding test case node with said data.

6. The method of claim 1, wherein the method further comprises, for each test case:
   updating each said corresponding component node with said data.

7. The method of claim 1, wherein the method further comprises, for each test case:
   marking the one or more software components.

8. The method of claim 7, wherein the method further comprises, for each test case, prior to said marking:
   unmarking a software component marked during application of a previous test case.

9. The method of claim 7, wherein said marking comprises:
   marking an instruction executed during application of said test case.

10. The method of claim 7, wherein said marking comprises:
    marking a software component testing during application of said test case.

11. The method of claim 7, wherein said marking comprises:
    marking a component module executed during application of said test case.

12. The method of claim 7, wherein said marking comprises:
    marking a component function executed during application of said test case.

13. The method of claim 1, wherein said data identify one or more instructions of a software component executed during application of said test case.

14. The method of claim 1, wherein said data identify one or more modules of a software component executed during application of said test case.

15. The method of claim 1, further comprising:
    using said graph to identify one or more test cases configured to test a selected software component.

16. A computer readable medium storing instructions that, when executed by a computer, cause the computer to perform a method of mapping software components to test cases that test the software components, the method comprising:
    for each component in a set of software components, generating a corresponding component node in a bipartite graph;
    for each test case in a set of test cases configured to test the software components, generating a corresponding test case node in the graph;
    for each test case:
       applying said test case to test one or more software components;
       collecting data reflecting application of said test case; and
       updating the graph with edges coupling said corresponding test case node and one or more component nodes corresponding to software components tested by the test case; and
    for each software component tested by a test case, calculating a coverage rating configured to indicate the coverage achieved from executing said test case on said software component wherein the coverage rating is normalized to exclude dead code.

17. A computer readable medium containing a data structure configured for mapping software components to test cases configured to test the software components, the data structure comprising:
    a set of component nodes, each said component node corresponding to a software component;
    a set of test case nodes, each said test case node corresponding to a test case configured to test one or more software components; and
    edges coupling each said test case node to the component nodes corresponding to the software components tested by said corresponding test case, wherein each said edge coupling a test case node and a component node has an associated rating configured to reflect the coverage achieved from executing the corresponding test case on the corresponding software component, and wherein the coverage rating is normalized to exclude dead code.

18. The computer readable medium of claim 17, further comprising:
    for each software component tested by a test case, a rating configured to indicate the ability of the test case to locate bugs on the software component.

19. The computer readable medium of claim 17, wherein each said edge is configured to identify one or more of:
- a hardware configuration for executing said corresponding test case to test the corresponding software components; and
- a software configuration for executing said corresponding test case to test the corresponding software components.

20. The computer readable medium of claim 17, wherein each said edge is configured to indicate an amount of time needed to execute said corresponding test case.

21. A computer system for testing software, the computer system comprising:
- a set of software components;
- a set of test cases configured to test the software components;
- a testing tool configured to apply each test case in the set of test cases against a subset of the set of software components;
- a graph engine configured to generate a graph comprising:
  - component nodes corresponding to the software component;
  - test case nodes corresponding to the test cases; and
  - edges coupling each test case node to component nodes corresponding to software components tested by the corresponding test case; and
- a processor configured to generate, for each software component tested by a test case, a rating indicating the coverage achieved from executing the test case on the software component, wherein the coverage rating is normalized to exclude dead code.

22. The computer system of claim 21, wherein each component node:
identifies one or more test cases configured to test the corresponding software component.

23. The computer system of claim 21, wherein each test case node:
identifies one or more software components tested by the corresponding test case.

24. The computer system of claim 21, wherein each edge coupling a test case node and a component node has an associated rating configured to indicate how effectively the corresponding test case covers the corresponding software component.

25. The computer system of claim 21, wherein each edge coupling a test case node and a component node:
identifies one or more of a hardware configuration and a software configuration for testing the corresponding component with the corresponding test case.

26. The computer system of claim 21, wherein each edge coupling a test case node and a component node:
identifies an amount of time needed to test the corresponding component with the corresponding test case.

27. The computer system of claim 21, wherein said testing tool is configured to:
mark a first software component when it is tested by a first test case.

28. The computer system of claim 27, wherein said testing tool is further configured to, prior to said marking:
un-mark the first software component to remove a marking made during testing of the first software component by a second test case.

* * * * *